United States Patent [19]

Meyer

[11] 3,924,757
[45] Dec. 9, 1975

[54] BALE ACCUMULATOR
[76] Inventor: Frank A. Meyer, R.R. No. 3, Herington, Kans. 67449
[22] Filed: June 24, 1974
[21] Appl. No.: 482,586

Related U.S. Application Data
[63] Continuation of Ser. No. 283,902, Aug. 28, 1972, abandoned.

[52] U.S. Cl. ............... 214/6 B; 56/475; 198/31 AC
[51] Int. Cl.² ................. A01D 87/12; B65G 57/32
[58] Field of Search .......... 214/6 B; 198/31 AC, 68, 198/78, 81; 56/473.5, 474, 475, 479

[56] References Cited
UNITED STATES PATENTS

| | | | |
|---|---|---|---|
| 2,036,421 | 4/1936 | Luckie | 198/31 AC X |
| 2,692,713 | 10/1954 | Silva | 198/31 AC X |
| 2,736,159 | 2/1956 | Marshall | 56/475 |
| 2,822,659 | 2/1958 | Moore | 56/475 |
| 3,189,387 | 6/1965 | Nieto, Jr. | 214/6 B X |
| 3,308,971 | 3/1967 | Sinder et al. | 214/6 B |
| 3,361,279 | 1/1968 | Brown et al. | 214/6 B X |
| 3,499,550 | 3/1970 | Jensen | 214/6 B |

Primary Examiner—Robert J. Spar
Assistant Examiner—Leslie J. Paperner
Attorney, Agent, or Firm—Thomas M. Scofield

[57] ABSTRACT

A bale accumulator comprises a bottomless carrier which moves over the ground and receives bales formed by a windrow hay baler. The carrier is divided into two pairs of chutes extending in parallelism in the direction of movement thereof. Each pair of chutes has a common entrance for receiving individual bales discharged from the baler into the carrier. A primary bale guide gate in front of the entrances is responsive to engagement by bales successively discharged from the baler and directs successive bales into alternate entrances. A pair of secondary bale guide gates are provided in respective entrances, each secondary gate serving to direct successively received bales into alternate chutes of the pair of chutes associated with the common entrance. An automatic release mechanism permits the bales to discharge from the carrier after a pack of eight bales (arranged in two transverse rows of four bales each) has been loaded into the chutes.

4 Claims, 16 Drawing Figures

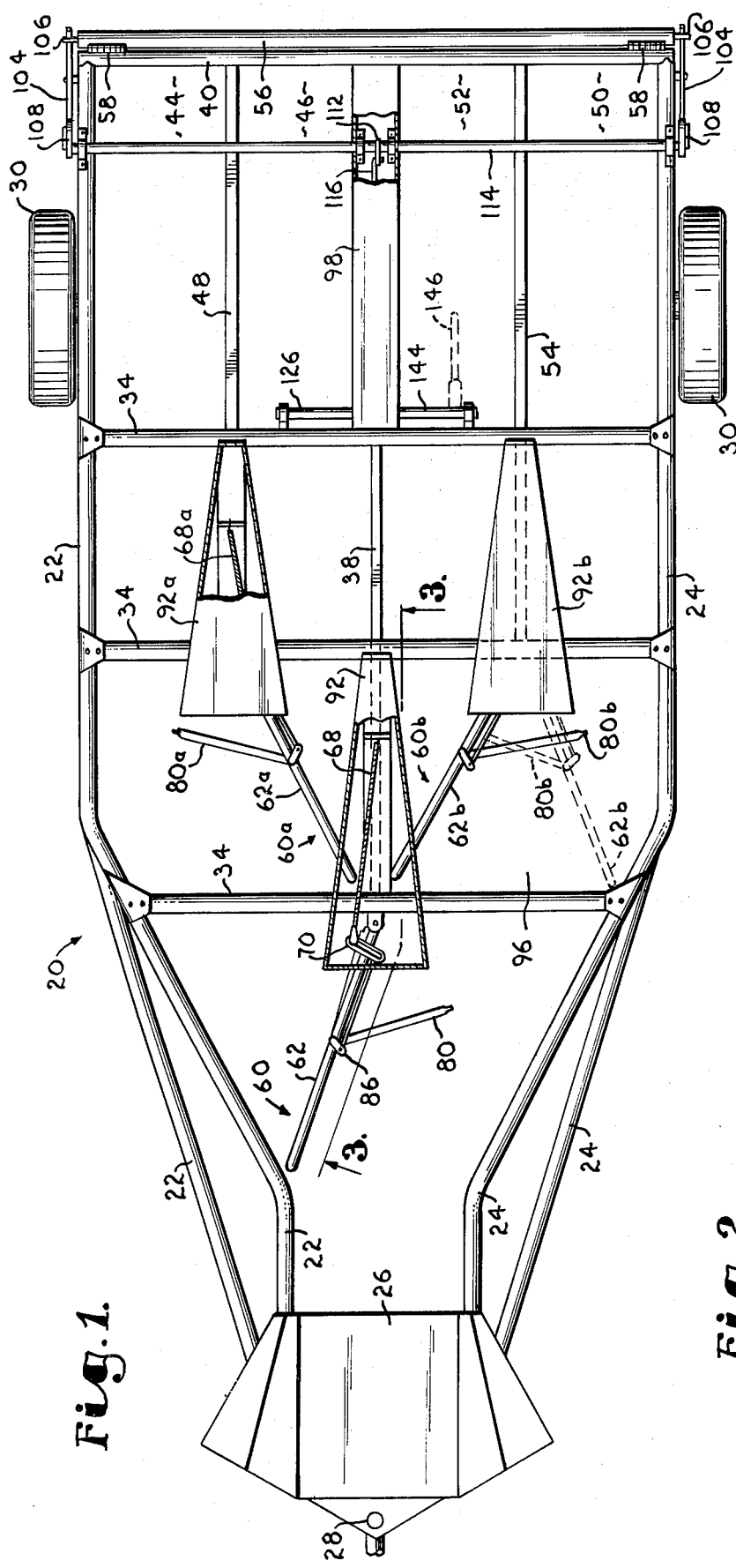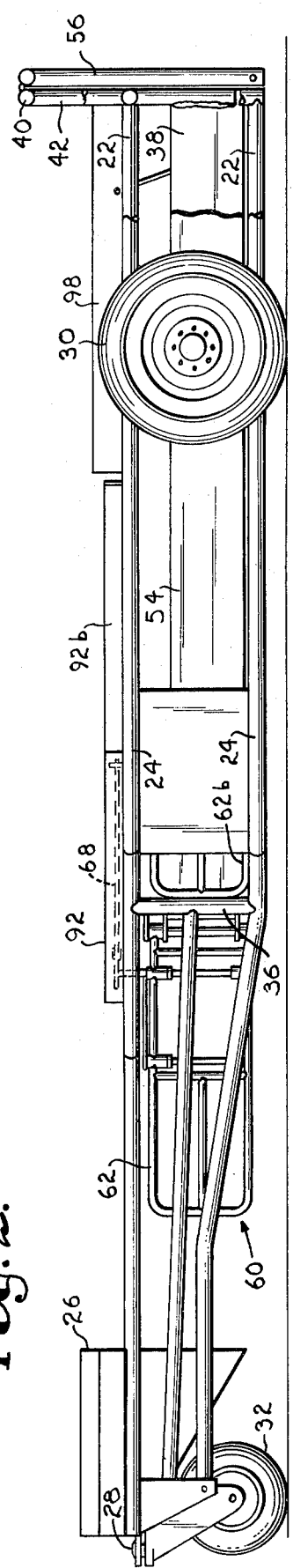

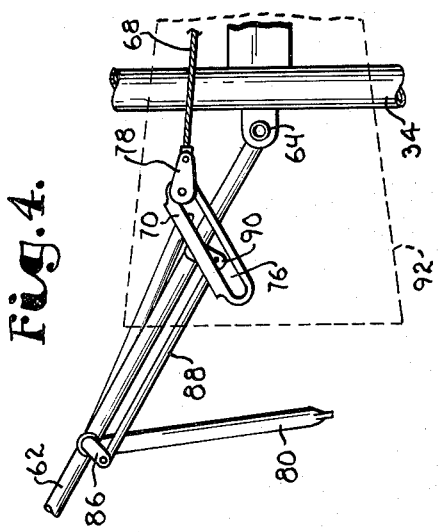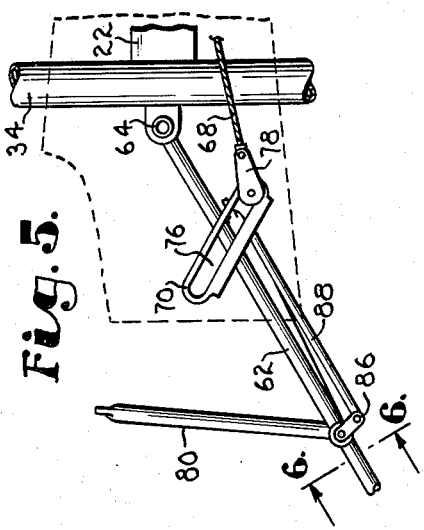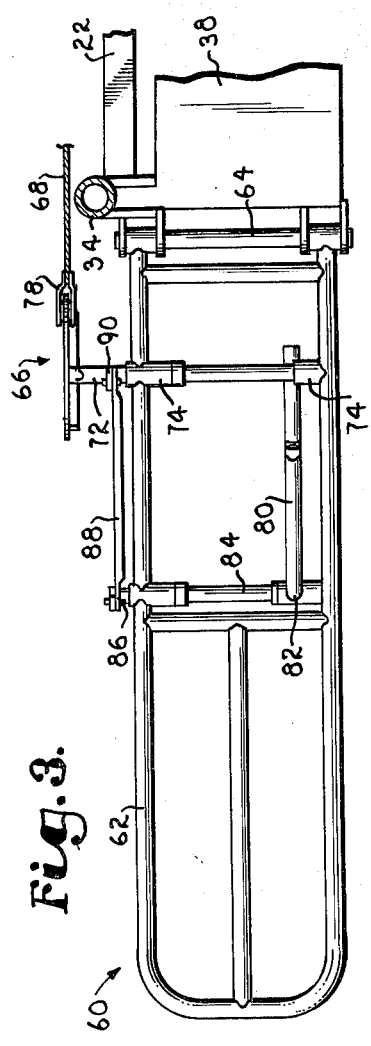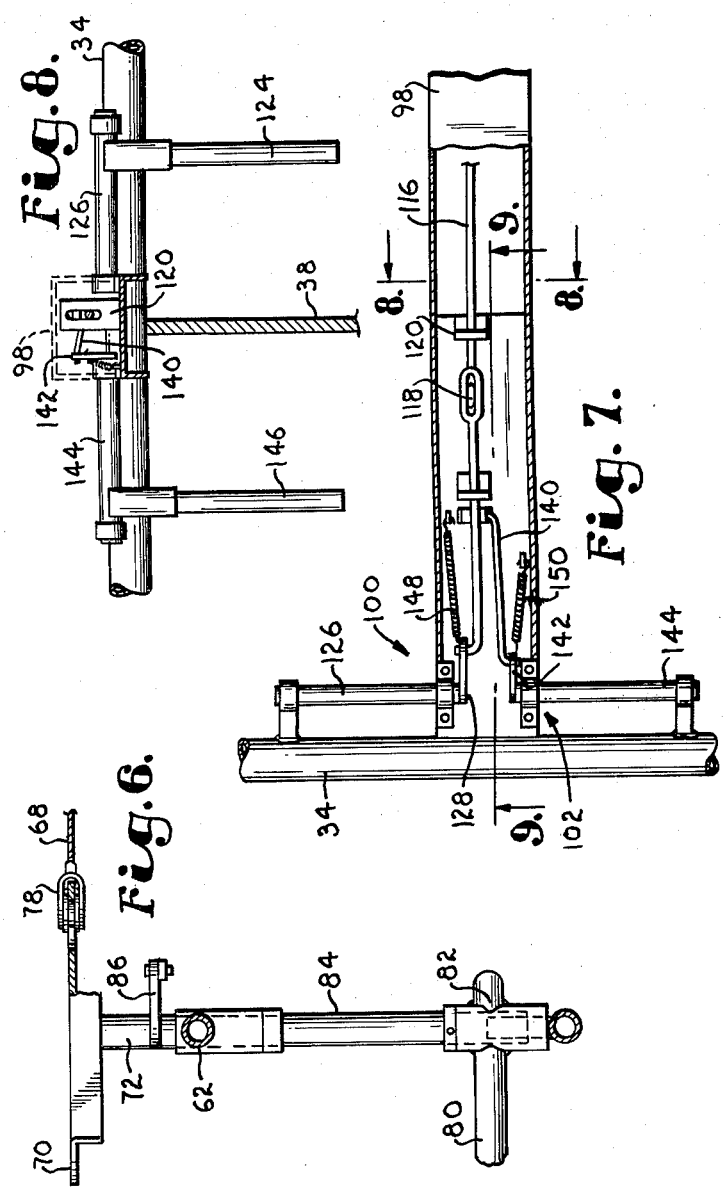

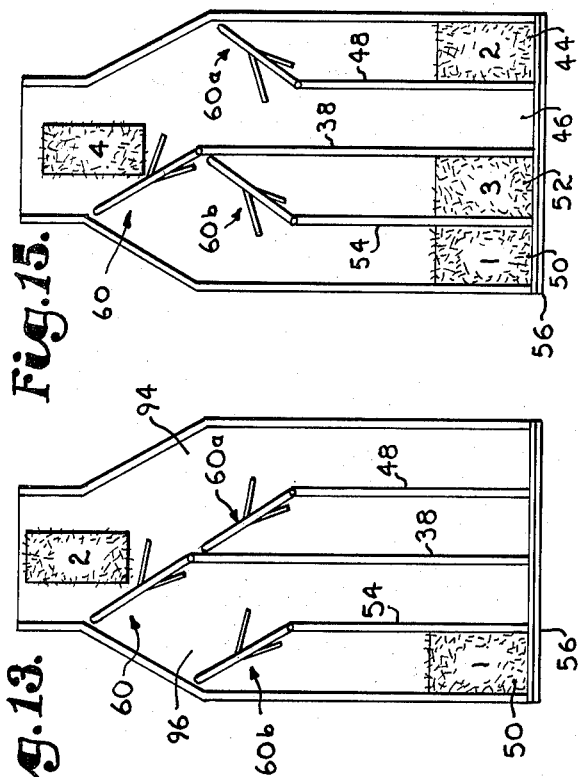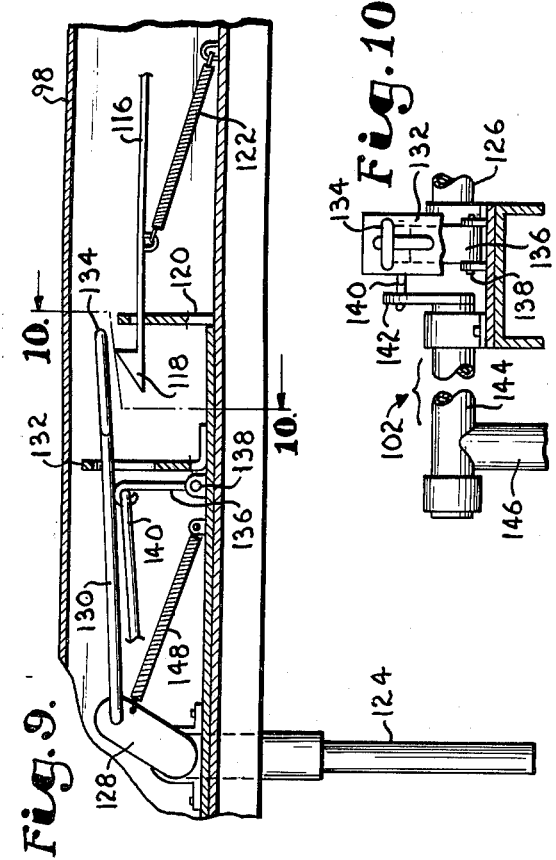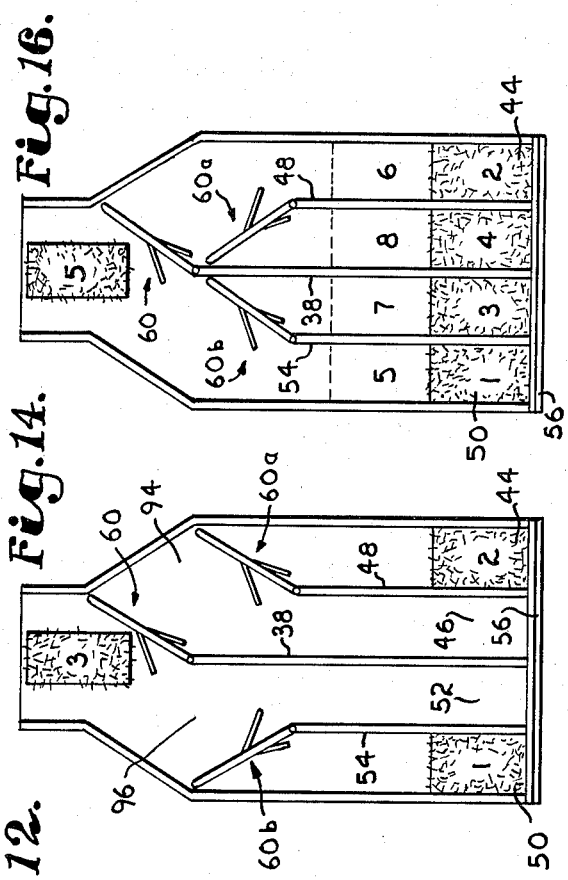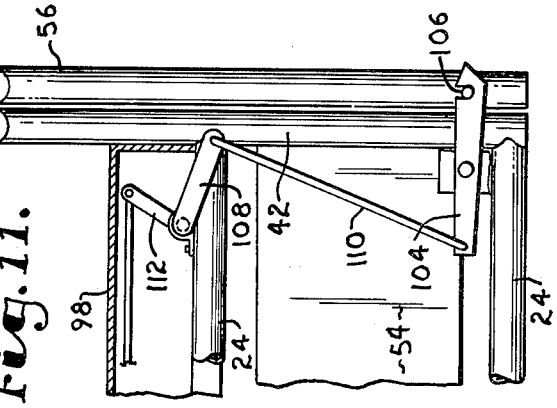

BALE ACCUMULATOR

This is a continuation of application Ser. No. 283,902, filed Aug. 28, 1972, now abandoned.

This invention relates to improvements in apparatus for use alone or in conjunction with a baler to assemble and align bales of hay or the like into multiple bale packs prior to discharge onto the ground.

A modern hay harvesting operation typically involves the use of a windrow hay baler in conjunction with apparatus for receiving the bales directly from the baler (or indirectly following pickup of the bales from the ground) and forming the bales into multiple bale packs for discharge onto the ground. A hydraulic loader is then employed to pick up the bale packs and load them on a wagon. Accordingly, it may be appreciated that the entire operation is implemented by machinery and does not require the traditional hand labor associated with hay harvesting.

It is preferred for efficient pick up of the bale packs that each pack have a generally square configuration, this being formed by assembling and aligning eight bales in two parallel rows of four bales each. A hydraulic bale fork attachment on a conventional tractor may then be employed to pick up the pack of eight bales in the pick up and loading phase of the operation. Bale fork loaders are particularly desirable for this purpose, and customarily employ two hydraulically operated hooks per bale which impale the bales from the top and enable the hydraulic lift to then elevate the entire pack as a unit. The hydraulic fork mechanism eliminates the need for insertion of lifting forks or the like beneath the pack, which of course, would be undesirable since the packs are lying directly on the ground.

Although the bale fork loader is an efficient device for picking up the bale packs, its use inherently requires that apparatus be employed in the intermediate phase of the operation (between baling and loading) which will properly form the packs in the correct pattern for pick up by the loader. One such apparatus in present use is a hydraulically powered machine having an accumulator which receives the bales from the baler in pairs, a hydraulic ram being automatically triggered after each pair of bales is received in succession to pack the bales in a two by four pattern. After the fourth operation of the ram the pack of eight is complete and is then pushed off of the accumulator bed by a second hydraulically powered mechanism to discharge the pack onto the ground. The operation then repeats and thus one pack of bales is discharged following delivery from the baler of each series of eight bales.

An accumulator of the type just described has an inherent cost disadvantage due to the number of hydraulic components involved and the attendant complexity associated with the manner in which the bale packs are formed and then discharged. Accordingly, it is an important object of the present invention to provide an improved bale accumulator which does not require hydraulic power and which is relatively uncomplex in its mechanical construction, in order to minimize the cost of the apparatus as well as provide a reliable machine which is relatively maintenance free.

It is another important object of this invention to provide a bale accumulator as aforesaid which will assemble and align the bales in the correct pattern for pick up off of the ground by a bale fork loader.

Still another important object of this invention is to provide a bale accumulator as aforesaid which is an improvement over prior art apparatus of the type such as shown and described in U.S. Pat. No. 2,736,159 to James W. Marshall, issued Feb. 28, 1956, in that additional bale capacity is provided together with a unique assembling and aligning arrangement which enables the accumulator to form the desired, essentially square bale pattern or pack discussed above.

Furthermore, it is an important object of the present invention to provide a bale guide gate for use in bale accumulators of the type employing a carrier for receiving the bales, wherein the gate is positive acting in response to engagement by a transient bale through the employment of an over-center mechanism which is directly actuated by the transient bale to change the line of action of the mechanism and thereby cause the gate member to shift as required to properly direct the bales into the chutes of the carrier.

Additionally, it is an important object of the present invention to provide an automatic release mechanism for the tailgate of bale accumulators, wherein such mechanism is normally disarmed and then, once armed by a bale preceding the final bale of the pack, is positively engaged with the linkage controlling the release of the tailgate latch.

In the drawings:

FIG. 1 is a plan view of the bale accumulator of the present invention, three of the screens being broken away to reveal details of construction;

FIG. 2 is a side elevational view of the accumulator;

FIG. 3 is an enlarged, fragmentary, vertical sectional view taken along line 3—3 of FIG. 1, showing the primary bale guide gate in side elevation;

FIG. 4 is an enlarged, fragmentary, plan view of the primary bale guide gate;

FIG. 5 is a view similar to FIG. 4 showing the gate in its alternate position;

FIG. 6 is a further enlarged, cross-sectional view taken along line 6—6 of FIG. 5;

FIG. 7 is an enlarged, fragmentary, plan view of the automatic release mechanism for the tailgate, the screen being broken away to reveal details of construction;

FIG. 8 is a cross-sectional view taken along line 8—8 of FIG. 7;

FIG. 9 is a cross-sectional view taken along line 9—9 of FIG. 7;

FIG. 10 is a cross-sectional view taken along line 10—10 of FIG. 9;

FIG. 11 is an enlarged, fragmentary, side elevational view of the rear of the carrier showing the tailgate and associated latch, parts being broken away to reveal details of construction; and FIGS. 12–16 are diagrammatic plan views of the carrier showing the sequential loading of the chutes.

Referring initially to FIGS. 1 and 2, a bottomless carrier is broadly denoted by the numeral 20 and comprises a framework constructed primarily of pipe stock bolted and welded together in the configuration illustrated. A pair of vertically spaced, horizontally extending, longitudinal frame members 22 define one side of the carrier 20 and, similarly, a second pair of longitudinal frame members 24 define the opposite side thereof. The frame members 22 and 24 converge toward the front of the carrier 20, the upper members 22 and 24 converging more sharply as may be appreciated from viewing FIG. 1. This presents a drawbar or tongue upon which a rearwardly inclined platform 26 is mounted directly behind a suitable hitch employed to connect the carrier 20 to the rear of a conventional windrow hay baler (not shown). The carrier 20 is supported on a tricycle gear consisting of two rear wheels 30 and a front wheel or caster 32 rotatable about an upright axis defined by a pivot pin 28.

The remainder of the framework of the carrier 20 consists of various frame members that provide structural support and divide the carrier into four chutes as will be discussed. Three cross members 34 may be seen in FIG. 1, and one of the upright frame members 36 between the longitudinal members 24 is revealed in FIG. 2. It should be understood that the carrier 20 is open on the bottom rearwardly of the front cross member 34, in that lower cross members are not employed so that the frame beneath the cross members 34 is vertically unobstructed except for the partition structure to now be described. (Alternatively, a floored construction may be employed, but mechanical means would then be required to shift the bales into the chutes.)

A longitudinal partition 38 extends the length of the carrier 20 rearwardly from the front cross member 34 and is centrally disposed with respect to the longitudinal side members 22 and 24. The partition 38 is in the nature of a panel secured to the front cross member 34 and suspended therefrom as may be seen in FIG. 3. The rear end of the partition 38 is rigidly suspended from a transverse, elevated beam 40 mounted on uprights 42 at the rear corners of the carrier 20. The partition 38 serves to divide the carrier 20 into two groups of chutes extending longitudinally of the carrier on opposite sides of the central partition 38. Each group consists of two parallel chutes, thus a total of four chutes extend in parallelism in the direction of movement of the carrier 20 behind the front cross member 34.

In FIG. 1 the pair of chutes above the central partition 38 as viewed in the drawing are designated by the reference numerals 44 and 46, the chute 44 being the outboard chute and the chute 46 being the inboard chute adjacent the central partition 38. These two chutes are separated by a longitudinal partition 48 extending longitudinally of the carrier 20 in parallelism with the side members 22 and the central partition 38. The forward end of the partition 48 is attached to the center cross member 34, and the rear end thereof is suspended beneath the beam 40 in the same manner as the central partition 38. Likewise, the two chutes below the central partition 38 as viewed in FIG. 1 are identified by the reference numerals 50 and 52, and comprise the outboard and inboard chutes of this pair respectively. A partition 54 separates the two chutes 50 and 52 and extends rearwardly from the center cross member 34 as revealed by the broken lines in FIG. 1.

Referring to FIGS. 1, 2, and 11, it may be seen that the carrier 20 is provided with a tailgate 56 hinged at 58 to the beam 40 for swinging movement about a horizontal axis at the top of the tailgate 56. The tailgate extends completely across the rear of the carrier 20 and thus is common to all of the chutes 44, 46, 50 and 52. The tailgate 56 is shown in its normal, closed position in which it serves to retain bales of hay in the chutes against discharge therefrom as will be subsequently discussed.

The four chutes are loaded with bales of hay by the action of three bale guide gates, a primary bale guide gate 60 and a pair of secondary bale guide gates 60a and 60b. The structure and manner of operation of each of the guide gates is identical, thus only the primary gate 60 is illustrated in detail herein (FIGS. 1-6). Accordingly, the primary gate 60 will be described in detail with the understanding that the secondary gates 60a and 60b operate in an analogous manner.

As is particularly clear in FIGS. 3-5, the primary gate 60 includes a blocking member 62 of skeletal frame construction swingable about the upright axis defined by a pivot shaft 64 secured to the overlying cross member 34 and the front end of the central partition 38. The blocking member 62 is held in either one of two positions by an over-center mechanism 66 provided with a coil spring 68 extending from a point of attachment on the partition 38 rearwardly of the blocking member 62. A rotatable element 70 of the mechanism 66 is mounted on the blocking member 62 for back and forth rotation about the upright axis defined by a rotatable stem 72 received within vertically spaced bushings 74 carried by the blocking member 62. The element 70 is provided with an elongated slot 76 defining a track that extends generally radially of the axis of rotation on opposite sides thereof. A pulley 78 is attached to the end of the spring 68 and rides in the slot 76 back and forth between the ends thereof.

A generally V-shaped actuating arm 80 extends laterally outwardly from the blocking member 62 and is secured at its apex 82 to an upright crankshaft 84 carried by the blocking member 62 and disposed midway between the pivot shaft 64 and the free end of the member 62. The crankshaft 84 drives a crank 86 fixed to its upper end which, in turn, via a connecting rod 88, actuates a crank arm 90 rigid with the rotatable stem 72 to which the element 70 is affixed. As may be appreciated from a comparison of FIGS. 4 and 5, the V-shaped arm 80 presents two arm components constituting the legs of the V, such components being alternately extended from the blocking member 62 as the member assumes the two positions thereof illustrated in these two FIGURES. The overcenter mechanism 66 may be covered by a protective screen 92 of triangular configuration illustrated by broken lines in FIGS. 4 and 5 and partially shown in full lines in FIG. 1.

With respect to the two secondary bale guide gates 60a and 60b, the components thereof are identified by the same reference numerals as set forth above with respect to the primary gate 60 with the addition of the "a" or "b" notation. It should be noted that the chutes 44 and 46 have a common entrance 94 and that the secondary gate 60a is disposed in the entrance 94 rearwardly of the primary gate 60. In similar fashion, the chutes 50 and 52 have a common entrance 96 in which the secondary gate 60b is disposed, also rearwardly of the primary gate 60. The center cross member 34 of the carrier frame serves as the support for the secondary gates 60a and 60b in the same manner as illustrated for the primary gate 60 in FIG. 3.

The automatic release mechanism for the tailgate 56 is shown in detail in FIGS. 7-11. First noting FIGS. 1 and 2, an elongated housing 98 is mounted on top of the central partition 38 and extends rearwardly from the rear cross member 34. A number of the components of the release mechanism are contained within the housing 98 as is best seen in FIGS. 7 and 9.

A trigger mechanism is broadly denoted 100 and is normally in a disarmed condition, arming means broadly designated 102 being provided for the purpose of arming the mechanism 100 just prior to the time that the tailgate 56 is to be released to permit the discharge of bales accumulated in the chutes 44, 46, 50 and 52. As is clear in FIG. 11, the tailgate 56 is normally held closed by a pivotal latch dog 104 which engages a lug 106 on the tailgate 56. The dog 104 is operated by a crank 108 connected thereto by a link 110, the crank 108 being actuated by an operating linkage 112 which extends forwardly toward the trigger mechanism 100 in the housing 98. In FIG. 1 it may be seen that two such latch dogs 104 are provided on opposite sides of the carrier 20 at the rear thereof, the cranks 108 for the respective dogs 104 being interconnected by a cross shaft 114 which extends through the housing 98 and is therein connected to the operating linkage 112.

The operating linkage 112 includes an operating rod 116 provided with a vertical projection or tooth 118 at its forward end. The rod 116 is held in a guide 120 for longitudinal reciprocal movement and is biased in the rearward direction by a return spring 122. The trigger mechanism 100 is provided with a depending sensing lever 124 which is disposed in the chute 46 in the path of movement of bales thereinto, the upper end of the lever 124 being secured to a horizontal pivot shaft 126 which extends into the housing 98. The inner end of the shaft 126 is provided with a crank arm 128, and an actuating member 130 in the form of a rearwardly extending rod is connected to the crank arm 128. The member 130 is received within a guide 132, the rear, free end thereof being formed into a loop or eye 134. The tooth 118 and the eye 134 comprise mutually engageable mating parts which are normally held out of engagement with each other by a support finger 136 forming a part of the arming means 102. The finger 136 is normally upright and is pivoted at its lower end as indicated at 138, the upper end of the finger 136 being connected by a link 140 to a crank arm 142 on the inner end of a horizontal pivot shaft 144 from which a sensing lever 146 depends into the chute 52.

OPERATION

The carrier 20 may be drawn behind a baler. Individual bales discharged from the baler are received at the front end of the carrier 20 by the inclined platform 26 and land on the ground in the confines of the converging, forward portions of the longitudinal frame members 22 and 24. Alternatively, if the carrier 20 is drawn behind a tractor, means (not shown) is provided to scoop the bales from the ground onto the platform 26. As the carrier 20 continues to advance, the bale strikes the arm 80 extending from the primary gate 60 and is then directed into one of the entrances 94 or 96 depending upon the position of the blocking member 62. The operation will be fully understood with reference to FIGS. 12–16 where the bales and the accumulator apparatus are illustrated diagrammatically and shown as the first, second, third, fourth and fifth bales, respectively, are discharged into the carrier 20 in an illustrated loading pattern.

Referring first to FIG. 12, the primary gate 60 and the secondary gates 60a and 60b are shown in their initial positions prior to loading of any of the chutes 44, 46, 50 and 52. As bale 1 is received by the primary gate 60 and strikes its actuating arm 80, the gate 60 shifts to the position thereof shown in FIG. 13 and the bale 1 passes into the common entrance 96 of the chutes 50 and 52. Bale 1 then engages the actuating arm 80b of the secondary gate 60b and the latter swings to the position thereof shown in FIG. 13 as the transient bale enters the outboard chute 50. As the carrier 20 continues to advance, the bale 1 is ultimately stopped by the tailgate 56 and is thus retained within the chute 50. The primary gate 60 and the secondary gate 60a are now properly positioned for receiving bale 2.

Now referring to FIGS. 13 and 14, it may be seen that bale 2 causes the primary gate 60 and then the secondary gate 60a to shift in a manner analogous to the action just described for bale 1, but in opposite directions to load the other outboard chute 44. Likewise, FIGS. 14, 15 and 16 illustrate the loading of the inboard chutes 52 and 46 with bales 3 and 4. In FIG. 16 it may be appreciated that the gates are back in their initial positions ready to receive bale 5 and repeat the sequence. Bales 5, 6, 7 and 8 are shown in FIG. 16 in phantom lines in their loaded positions within the chutes.

The action of each of the gates 60, 60a and 60b is identical and thus may be understood with reference to the detailed showing in FIGS. 3–6 of the primary gate 60. In particular, viewing FIG. 4, as the bale engages the outwardly projecting component of the V-shaped actuating arm 80, the arm is rotated counterclockwise about the axis through its apex formed by the upright crankshaft 84. This drives the crank 86 in a counterclockwise direction to likewise rotate the crank arm 90 and, therefore, rotate the element 70 of the over-center mechanism 66. As the track formed by the slot 76 in the element 70 moves past deadcenter, the pulley 78 moves along the track to the position thereof shown in FIG. 5. This is a snap-action effect caused by the bias of the extended coil spring 68. It may be appreciated that this rapid shifting of the pulley 78 changes the line of action of the spring 68 to thereby cause the blocking member 62 to swing rapidly about its axis (pivot shaft 64) to the position thereof shown in FIG. 5. The limits of the alternate positions of the gates are defined by the framework of the carrier 20 as may be appreciated from viewing FIGS. 1 and 2; the forward tip of blocking member 62, for example, alternately engages upper frame members 22 and 24 at the limits of its two positions.

As bale 7 is loaded into chute 52 it swings the sensing lever 146 as illustrated by the broken lines in FIG. 1. This arms the trigger mechanism 100 as may be appreciated from viewing FIG. 9. As the lever 146 is swung rearwardly by bale 7, the link 140 attached to the support finger 136 is pulled forwardly to remove the support finger from the actuating member 130 of the trigger mechanism 100. This causes the eye 134 formed on the end of the member 130 to drop into surrounding relationship to the previously underlying tooth 118 on the forward end of the operating rod 116. Accordingly, the member 130 and the rod 116 are now positively mechanically interconnected.

Now as bale 8 is loaded into the chute 46, it engages the sensing lever 124 of the trigger mechanism 100 and causes it to swing rearwardly. This rotates the crank arm 128 counterclockwise (as viewed in FIG. 9) to pull the operating rod 116 forwardly and release the latch dogs 104. It may be appreciated in FIG. 11 that actuation of the operating rod 116 causes the cranks 108 to rotate counterclockwise thereby swinging the rear ends of the latch dogs 104 in a downward direction out of engagement with the lugs 106. This releases the tailgate 56 for rearward swinging movement about its hinges 58 as the tailgate 56 is pushed open by the bales as the carrier 20 continues its forward movement. Once the pack of eight bales has cleared the tailgate 56, it recloses and is automatically relocked since the sensing levers 124 and 146 have now returned to their normal, vertically depending positions.

It should be understood that, although the sensing lever 124 of the trigger mechanism 100 is also operated by bale 4, this does not release the tailgate 56 since the mechanism is still in its normal, disarmed condition. Furthermore, the momentary arming caused by the transient bale 3 during the time that it engages lever 146 also is ineffective to release the tailgate. But the arming accomplished by the bale 7 is effective since this bale is held in front of bale 3 to maintain the trigger mechanism 100 in the armed condition, thus release of the tailgate 56 is effected when the next bale (bale 8) is loaded.

It should be further understood that there are operational alternatives to that as discussed above. First of all, with the sensing levers 124 and 146 located as shown, the gates 60 and 60a must be positioned as shown but the secondary gate 60b can start in either of its positions. Thus, gate 60b may initially be in either the position thereof shown in FIG. 12 and discussed above, or in the position as seen in FIG. 13.

The required starting positions of the gates depend on the locations of the sensing levers 124 and 146. The location of the arming lever 146 may be varied somewhat as this lever may be actuated by bale 4 through bale 7 inclusive (as designated in FIG. 16). This, of course, presumes that the sensing lever 124 of the trigger mechanism 100 remains located as shown herein. With relocation of the trigger lever 124, the starting positions of the gates necessarily change.

Regardless of the starting positions, however, the gates will cycle every four bales and return to their original starting positions. It may be appreciated, therefore, that the arming and trigger levers 146 and 124 may be shifted along the chutes from the positions illustrated (or the chutes lengthened rearwardly of the levers as necessary) to cause the discharge of any multiple of four bales after accumulation thereof. Therefore, besides the two-by-four pack, groups of four, 12 or 16 bales, for example, may be readily accumulated and discharged as a pack if desired for particular applications.

Having thus described the invention, what is claimed as new and desired to be secured by Letters Patent is:

1. In a bale accumulator employing a carrier adapted for movement over the ground, where the carrier is divided into a plurality of bale-receiving chutes extending in parallelism in the direction of movement thereof, bale guide structure on the carrier for loading the chutes with successively received bales and including a bale guide gate for directing bales successively received by the gate in alternate directions, said gate comprising:
   a blocking member mounted for swinging movement about a first upright axis between a pair of operating positions corresponding to said directions;
   an over-center mechanism coupled with said blocking member for biasing the latter toward either one or the other of said positions,
   said mechanism including a rotatable element mounted on said blocking member for back and forth movement about a second upright axis spaced from said first axis, and yieldable means having a movable connection with said element and applying force thereto to effect said biasing of the blocking member; and
   an actuating arm coupled with said element and extending from said blocking member for engagement by a transient bale,
   said arm being responsive to said engagement by a transient bale for rotating said element to change the line of action of said yieldable means to cause the blocking member to change positions.

2. The bale guide gate as claimed in claim 1, wherein said element is provided with means defining a track extending generally radially outwardly from said second axis on opposite sides thereof, said connection being movable along said track to effect said change in the line of action of said yieldable means when said element is rotated.

3. The bale guide gate as claimed in claim 2, wherein said arm is of generally V-shaped configuration to present an apex from which a pair of arm components extend, there being means mounting said arm on said blocking member for pivotal movement about said apex between a first position where one of said arm components extends from one side of said blocking member for engagement by a transient bale, and a second position where the other of said arm components extends from the opposite side of said blocking member for engagement by a transient bale.

4. A bale accumulator comprising:
   a carrier adapted for movement over the ground, and having means at the front of the carrier for successively receiving individual bales,
   said carrier being provided with partition structure dividing the carrier into two pairs of chutes extending in parallelism in the direction of movement thereof,
   each of said pairs of chutes having a common entrance for receiving individual bales;
   a primary bale guide gate adjacent said bale receiving means and located in front of said entrances,
   said primary gate being responsive to engagement by bales successively received for directing successive bales into alternate entrances;
   a pair of secondary bale guide gates, each disposed in a corresponding entrance for receiving individual bales directed thereinto by said primary gate,
   each of said secondary gates being responsive to engagement by successive bales for directing the latter into alternate chutes of the pair of chutes associated with the respective entrance, whereby to load the four chutes with bales in a predetermined order of delivery; and
   a tailgate on said carrier common to all of said chutes and movable between a normal, closed position retaining the bales in the chutes against discharge therefrom, and an open position for permitting discharge of the accumulated bales once the chutes are loaded,
   each of said bale guide gates comprising:
   a blocking member mounted for swinging movement about a first upright axis between a pair of operating positions;
   an over-center mechanism coupled with said blocking member for biasing the latter toward either one or the other of said positions,
   said mechanism including a rotatable element mounted on said blocking member for back and forth movement about a second upright axis spaced from said first axis, and yieldable means having a movable connection with said element and applying force thereto to effect said biasing of the blocking member; and an actuating arm coupled with said element and extending from said blocking member for engagement by a transient bale, said arm being responsive to said engagement by a transient bale for rotating said element to change the line of action of said yieldable means to cause the blocking member to change positions.

* * * * *